March 24, 1936.   K. L. SCOTT   2,035,248
METHOD OF AND APPARATUS FOR DETERMINING THE
MAGNETIC CHARACTERISTICS OF MATERIAL
Filed Jan. 1, 1930   2 Sheets-Sheet 1
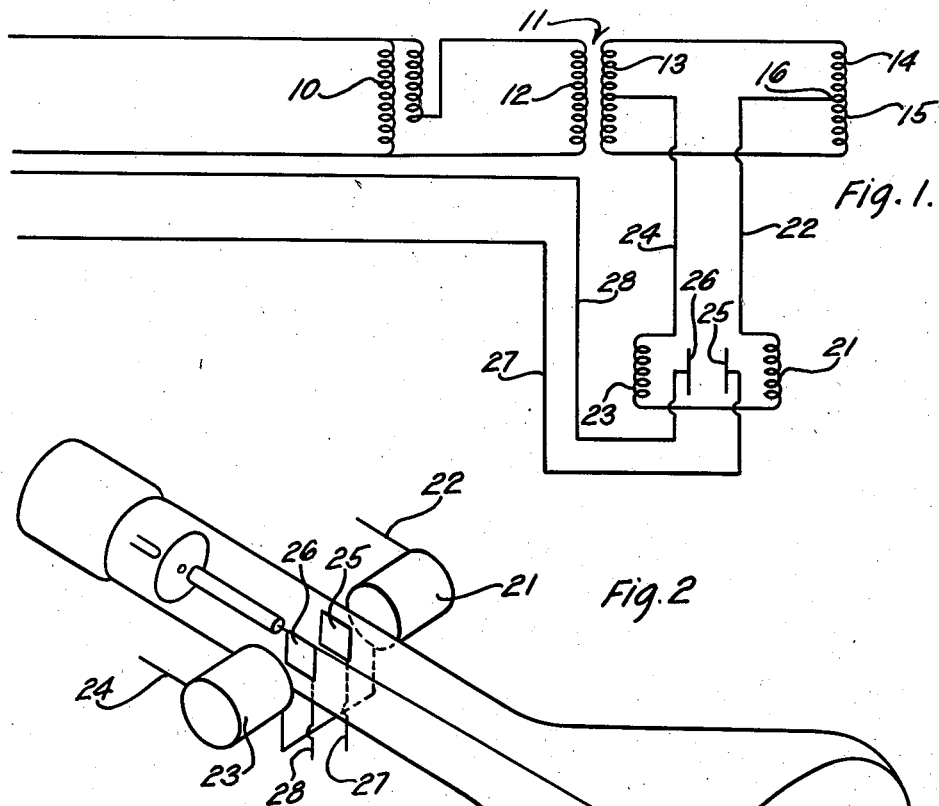
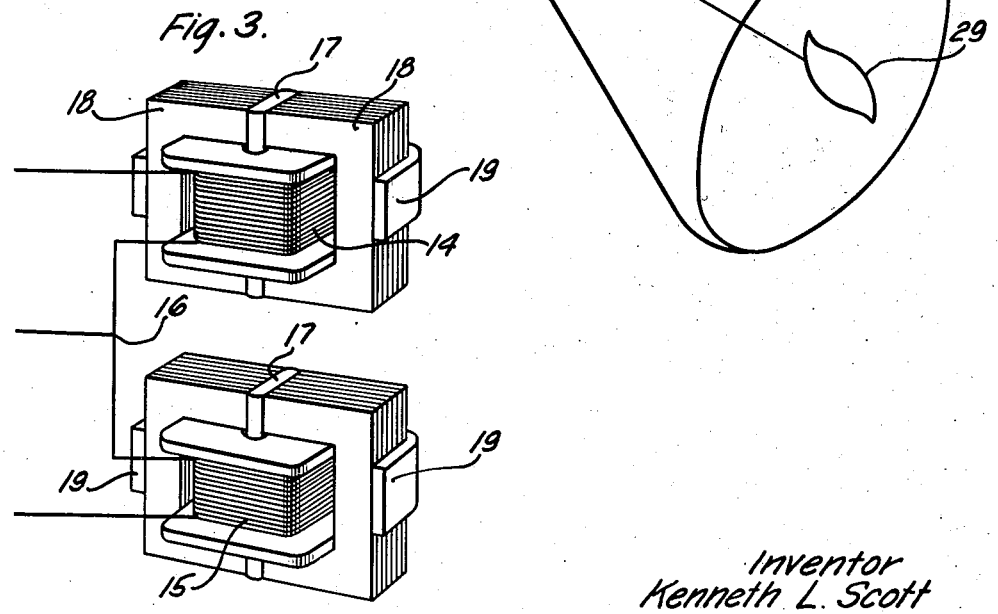
Inventor
Kenneth L. Scott
By H.B. Whitfield Att'y.

March 24, 1936.                    K. L. SCOTT                    2,035,248
              METHOD OF AND APPARATUS FOR DETERMINING THE
                  MAGNETIC CHARACTERISTICS OF MATERIAL
                        Filed Jan. 1, 1930          2 Sheets-Sheet 2
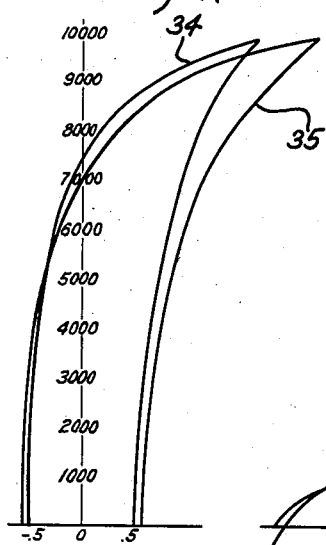
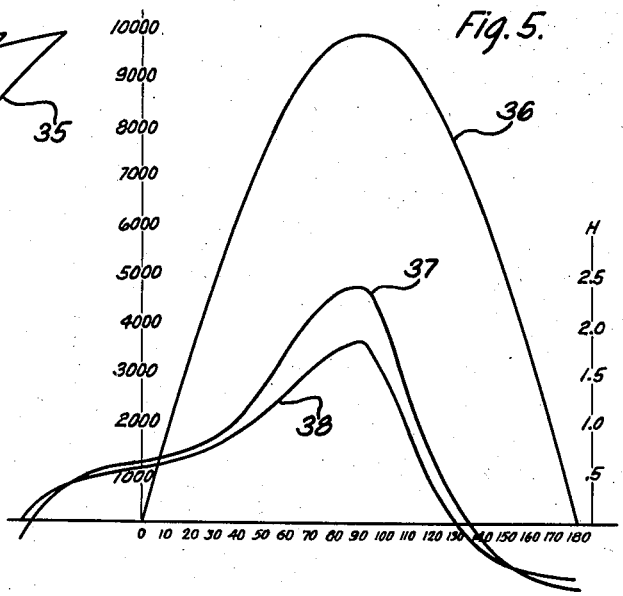
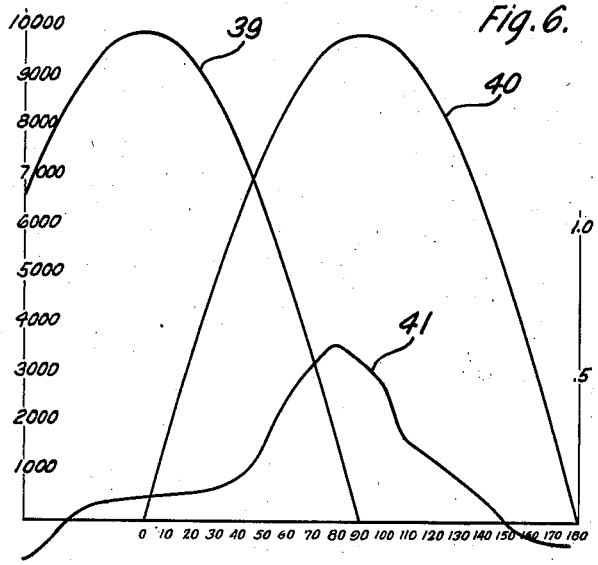
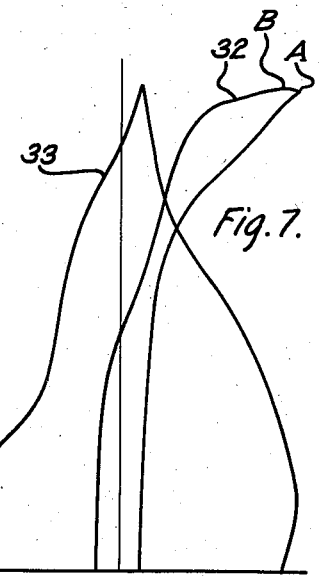
Inventor
Kenneth L. Scott
By H.B. Whitfield Att'y.

Patented Mar. 24, 1936

2,035,248

UNITED STATES PATENT OFFICE 2,035,248

METHOD OF AND APPARATUS FOR DETERMINING THE MAGNETIC CHARACTERISTICS OF MATERIAL

Kenneth L. Scott, Western Springs, Ill., assignor to Western Electric Company, Incorporated, New York, N. Y., a corporation of New York Application January 1, 1930, Serial No. 417,839

11 Claims. (Cl. 175—183)

This invention relates to a method of and an apparatus for determining the magnetic characteristics of material, and more particularly to a method of and an apparatus especially adapted to the determining of the magnetic characteristics of soft metal parts, such as relay cores.

The primary object of this invention is to provide a method and an apparatus which is simple and efficient and which allows the magnetic characteristics of a metallic part to be readily and accurately determined.

In accordance with one embodiment of the invention a sine wave of alternating voltage is applied to the primary of a transformer, the secondary of which is in closed circuit with interconnected coils for receiving test and standard specimens of material of equal cross section, the common points of the coils being connected to the mid-point of the secondary through the deflecting coils of a cathode ray oscillograph. Under such conditions equal flux densities exist in the specimens at every instant of time and the differences in the magnetizing current control the oscillograph to produce patterns visually indicating the differences in the magnetic characteristics of the specimens.

Other objects will be apparent from the following detailed description when considered in connection with the accompanying drawings, wherein Fig. 1 is a wiring diagram illustrating the invention;

Fig. 2 is a diagrammatic illustration of a cathode ray oscillograph as incorporated in the invention;

Fig. 3 is a perspective view of testing coils and clamping means for holding magnetic yokes in engagement with members to be tested, and Figs. 4, 5, 6 and 7 are illustrations of the graphical derivation from actual hysteresis loops of patterns which would be produced by the apparatus.

The wiring diagram shown in Fig. 1 illustrates a testing circuit provided with an induction regulator 10 and a transformer 11, the latter having a primary coil 12 and a secondary coil 13. Two test coils 14 and 15 which are similar in size and shape and which have an equal number of turns are disposed in the circuit and electrically connected to each other by a common terminal indicated at 16.

The coils 14 and 15 are adapted to receive cores or members indicated at 17 whose magnetic properties are to be compared. Laminated magnetic yokes 18 are provided for completing the magnetic circuits for the test specimens, and are disposed in close engagement with the members 17 and held in this position by clamps 19 or the like.

To bring about the visual indicating means a cathode ray oscillograph is electrically connected to the testing circuit. This connection is brought about by an indicating circuit which electrically connects a deflecting coil 21 to the terminal 16 by a conductor 22, and a deflecting coil 23 to the exact center of the secondary coil 13 of the transformer 11 by a conductor 24. Deflecting plates 25 and 26 are disposed upon each side of the path of the electron beam in the oscillograph and are in electrical connection with an alternating source of current through conductors 27 and 28 respectively. Further detailed description of the oscillograph is deemed unnecessary as it is of a well known art, and also since its structure details do not form a part of the present invention.

From the foregoing description of the various parts of the apparatus the operation thereof will be more clearly understood. A source of alternating current energy, preferably of lower frequency than sixty cycles per second, is supplied to the testing circuit. Due to the midpoint connection of the transformer the test coils 14 and 15, which are exactly equal in size and shape and have an equal number of turns, will have exactly equal voltages impressed thereon. Therefore, the flux densities in the cores of the test coils; for example, the test specimens or members 17, will always be equal if their cross-sections are equal. This is a valuable feature of the invention as it provides that the comparison of magnetic properties in the two specimens shall always be made at equal flux densities. The flux densities in the two cores or members 17 may be varied simultaneously by varying the voltage impressed on the test coils. This is accomplished by the actuation of the induction regulator 10.

Consideration of Fig. 1 will show that the indicating circuit, which is connected with the test circuit at the common terminal 16 of the test coils 14 and 15 and the exact center of the secondary coil 13, will carry a current equal to the difference between the magnetizing currents flowing in the two test coils. If the cores or members 17 have identical magnetic properties, no current will flow in this indicating circuit, since the flux densities in the members are equal. By the passing of this current through the deflecting coils which are disposed properly with respect to the electron beam, the spot on the oscillograph will be given a deflection directly proportional to the difference in magnetizing current proper to any two test specimens placed in the test coils at any desired value of magnetic induction. In order to produce a pattern with recognizable features such as that indicated at 29, it is necessary that the oscillograph spot be simultaneously deflected along a perpendicular axis by an amount proportional to the magnetic induction itself, while the oscillograph spot is deflected along the horizontal axis by the deflecting coils 21 and 23. This is accomplished by applying a sine wave of electromotive force to the deflecting plates 25 and 26. If the voltage applied to an iron cored coil is sinusoidal the wave form of the flux in the core will be sinusoidal, provided the resistance drop in the coil is kept sufficiently low. Therefore, if the voltage impressed on the test coils 14 and 15 is sinusoidal, this voltage can serve as a source of deflecting potential for the oscillograph, due to the connection of the indicating circuit with the test coils, which will have the same wave form as the flux in the members 17.

If the alternating source of current is two-phase, a deflecting potential can be secured which will not only have the same wave form as the flux in the members 17 but which will be in time phase with it. If only a single-phase source of current is available, the deflecting potential will be of the proper wave form, but it will be ninety degrees out of phase with the flux. Useful patterns may be obtained, however, with either source of current, but the use of a two-phase source is preferable.

In Figs. 4 to 7 inclusive are graphically derived the oscillograph patterns, only half of each being shown enlarged, which the apparatus would produce automatically by the use of silicon steel cores of specimens in a strained and unstrained condition. In Fig. 4 is illustrated the usual hysteresis loops, determined ballistically, of two silicon steel specimens in a strained and annealed condition, which are obtained by plotting maxwells per square centimeter as ordinates and magnetizing force as abscissae. Regarding Fig. 5 the curve 36 represents the time variation of flux density in the specimen and is obtained by plotting maxwells per square centimeter as ordinates and electrical degrees as abscissae. Curves 37 and 38, which have gilberts per centimeter as ordinates and electrical degrees as abscissae, are derived point by point from curves 34, 35 and 36 by following a perpendicular from a point on the horizontal axis of Fig. 5 to the intersection with curve 36, thence along a horizontal line to curve 34, representing the annealed steel, and curve 35 the strained steel from which the corresponding magnetizing forces are read off and plotted above the starting point on the horizontal axis of Fig. 5, as points on curves 37 and 38.

Curve 41 of Fig. 6 is derived by plotting differences, enlarged, between the magnetizing force curves 37 and 38 with the same ordinate and abscissa units referred to in connection with Fig. 5. It is noted that the peak in the curve 41 does not necessarily coincide with the peak of curve 40, which, like curve 36, is a sine wave of flux density, and consequently the tip A of the pattern 32 of Fig. 7 which is plotted with maxwells per square centimeter as ordinates and flux density as abscissae, does not necessarily coincide with the topmost point B of the pattern. The pattern 32 is obtained by plotting the several values derived from the curves 40 and 41 along mutually perpendicular axes in Fig. 7. Curve 33 of Fig. 7 is the counterpart of curve 32 but displaced through a phase angle of 90° due to the displacement of curve 39 of Fig. 6 through a corresponding angle and is obtained in a manner similar to that described for curve 32. The curves 32 and 33 represent the patterns produced on the oscillograph. By examining curve 32 and noting the displacement of the point B from the vertical axis, the difference in the permeabilities of the two test samples may be determined. The sign of this difference will also be indicated by noting whether the pattern 32 is displaced to the right or left of the vertical axis. This makes it possible to ascertain whether the unknown test specimen or the standard specimen has the higher permeability. Similarly, the width of the pattern 32 at its intersection with the horizontal axis is proportional to the difference between the coercive forces of the two specimens. Thus an observer can tell which has the higher coercive force.

Therefore, with patterns produced by the combined horizontal and vertical deflection of the electron beam in the oscillograph the magnetic characteristics of the cores or members may be automatically rendered into visible form. The intercept on the horizontal axis (Fig. 7) by the pattern 33 is proportional to the required differences in permeabilities whereas the displacement of the tip of the pattern 33 from the vertical axis is proportional to the difference in coercive force in the cores. This is the reverse of which is true for pattern 32.

In view of the fact that the component of the magnetizing current flowing in the test coils, which is related to eddy currents, is nearly equal in both coils, the differences between the components will be small, and the effect of eddy currents in the cores will be largely kept out of the oscillograph patterns. Since these currents in the test coils cancel one another as far as the deflecting coils are concerned, the test coils are substantially alike.

It has been thoroughly pointed out how the magnetic characteristics of materials may be determined by the specific embodiment of this invention, but, in addition, since it is well known that the magnetic characteristics of magnetizable materials are closely related to and can be correlated with the mechanical characteristics such as hardness of these materials, the invention can also be used to render into visual form the differences in mechanical properties of test specimens, such as tool steel parts or tools. In this way faults in heat treatment or flaws in finished parts may be detected. The process of doing this is to read from the patterns the differences in magnetic properties of the specimens in the manner previously described for magnetic materials, and then interpret these differences in magnetic properties of the specimens in terms of the associated mechanical properties. For example, in general, the greater the mechanical hardness of a specimen, the lower is its magnetic permeability and the higher is its coercive force, so, of two specimens under test the one having the lower permeability and higher coercive force, as disclosed by the oscillograph pattern, will have the greater hardness.

Although a specific form of apparatus has been disclosed as exemplifying the embodiment of the invention, it is understood that other forms of apparatus might be used without departing from the spirit and scope of the present invention.

What is claimed is:

1. In an apparatus of the character described, a testing circuit comprising test coils connected in series for receiving in each coil a member to be tested, a transformer having a secondary coil in electrical connection with said test coils, an indicating circuit disposed in electrical connection with said secondary coil and said test coils for deflecting a ray of an oscillograph for indicating proportionally the differences in permeabilities in the members, and means for deflecting the ray for indicating proportionally the differences in coercive force in the members whereby these characteristics of the members may be read directly.

2. A method of determining the magnetic characteristics of members of materials, which consists of disposing the members as cores in like coils, inducing equal flux densities in the members by applying currents of equal voltage to said coils, and controlling an oscillograph by the differences in magnetizing currents passing through said coils.

3. A method of determining the mechanical characteristics of members of materials, which consists of disposing the members as cores in test coils connected together and in closed circuit with the secondary of a transformer, inducing equal flux densities in the members by impressing a voltage on the transformer, and controlling an oscillograph by the differences in magnetizing currents passing through the test coils.

4. In a testing device, a transformer, a pair of test coils having an equal number of turns connected in series to the secondary of said transformer, a conductor connected to the midpoint of said secondary and to the junction of the test coils, and an indicating device associated with said conductor responsive to the difference in magnetizing currents in the test coils.

5. In a testing device, a pair of test coils having an equal number of turns, means for impressing equal voltages on said test coils, and an indicating device responsive to the instantaneous differences in magnetizing currents in the test coils.

6. In a testing device, a pair of test coils having an equal number of turns, means for applying equal voltages to said coils including a common conductor between the two terminal leads of said coils and said voltage applying means whereby magnetizing currents will flow in the conductor in accordance with the differences between the characteristics of the material being tested and an indicating device associated with and responsive to the current in said conductor.

7. In an apparatus for testing magnetic materials, a pair of test coils, means for applying equal voltages to the test coils, and means responsive to the difference in the wave form of the magnetizing currents in said coils for indicating the difference in magnetic properties of materials inserted in said coils.

8. In an apparatus for testing magnetic materials, a pair of test coils, means for applying equal voltages to said test coils, a cathode ray device for producing a cathode ray, means responsive to the difference in the wave form of the magnetizing currents in said test coils for deflecting said ray along one axis, and means for continuously moving said ray along a perpendicular axis to indicate the magnetic properties of materials inserted in said coils.

9. In an apparatus for testing magnetic materials, a pair of test coils, means for applying equal voltages to said coils, and means for visually indicating the difference in the wave forms of the magnetizing currents.

10. In an apparatus of the character described, a testing circuit comprising test coils for receiving members to be tested, a transformer having a secondary coil in electrical connection with said test coils, means associated with said transformer and test coils for maintaining the voltages applied to the test coils equal, and means for indicating the difference in the instantaneous values of the permeabilities of materials inserted in the test coils.

11. In an apparatus of the character described, a testing circuit comprising test coils for receiving members to be tested, means for applying equal voltages to said coils, and means responsive to the magnetizing currents of said coils for indicating permeability at a selected instantaneous voltage.

KENNETH L. SCOTT.